(12) United States Patent
Robinson et al.

(10) Patent No.: US 7,770,807 B2
(45) Date of Patent: Aug. 10, 2010

(54) WATER VALVE ASSEMBLY

(75) Inventors: Paul Andrew Robinson, Tunbridge Wells (GB); John Patrick Cheek, Tunbridge Wells (GB); Matthew Robert Riley, Marden (GB)

(73) Assignee: Aqualisa Products Limited, Kent (GB)

( * ) Notice: Subject to any disclaimer, the term of this patent is extended or adjusted under 35 U.S.C. 154(b) by 583 days.

(21) Appl. No.: 11/692,603

(22) Filed: Mar. 28, 2007

(65) Prior Publication Data
US 2007/0228181 A1 Oct. 4, 2007

(30) Foreign Application Priority Data
Mar. 29, 2006 (GB) ................................ 0606300.2

(51) Int. Cl.
*G05D 23/13* (2006.01)
(52) U.S. Cl. ................. 236/12.1; 236/12.11; 236/12.15
(58) Field of Classification Search ................. 236/12.1, 236/12.11, 12.14, 12.15
See application file for complete search history.

(56) References Cited

U.S. PATENT DOCUMENTS

| | | | |
|---|---|---|---|
| 3,563,468 A | 2/1971 | Tallcouch | |
| 3,582,229 A | 6/1971 | Troesch | |
| 4,473,088 A * | 9/1984 | Dotter | 137/98 |
| 4,528,709 A | 7/1985 | Getz et al. | |
| 4,607,793 A | 8/1986 | Eberle | |
| 5,058,804 A * | 10/1991 | Yonekubo et al. | 236/12.12 |
| 5,577,660 A * | 11/1996 | Hansen | 236/12.12 |
| 6,250,559 B1 * | 6/2001 | Knauss | 236/12.2 |
| 7,458,520 B2 * | 12/2008 | Belz et al. | 236/12.12 |
| 2004/0123910 A1 | 7/2004 | Yardley | |

FOREIGN PATENT DOCUMENTS

| | | |
|---|---|---|
| AU | 200247546 A1 | 8/2002 |
| EP | 0 009 514 A3 | 4/1980 |
| EP | 0 280 482 B1 | 8/1988 |
| EP | 0 335 485 B1 | 10/1989 |
| GB | 869 525 | 5/1961 |
| GB | 1 220 586 | 1/1971 |
| GB | 2 298 480 A | 9/1996 |
| GB | 2 359 610 A | 8/2001 |

(Continued)

*Primary Examiner*—Marc E Norman
(74) *Attorney, Agent, or Firm*—Foley & Lardner LLP

(57) ABSTRACT

A water valve assembly including a housing, an inlet chamber defining a water inlet for receiving a flow of water into the inlet chamber and a valve for controlling the flow of water through the inlet into the inlet chamber. A mixing chamber is connected to the inlet chamber so as to receive water from the inlet chamber, the mixing chamber defining a supplementary water inlet for receiving a supplementary flow of water and defining a mixed water outlet from which a mixture of water from the inlet chamber and the supplementary water inlet may be provided. The inlet chamber and the mixing chamber are both provided within the first housing and are arranged one within the other. A second housing may be provided with an inlet chamber, a valve for controlling flow of water into the inlet chamber and a supplementary water outlet for connection to the supplementary water inlet of the first housing. The two housings can be arranged in a relatively flat configuration with water connections at an inlet end of the assembly and control connections at a control end of the assembly.

3 Claims, 5 Drawing Sheets

FOREIGN PATENT DOCUMENTS

| | | |
|---|---|---|
| GB | 2 376 733 A | 12/2002 |
| GB | 2 404 000 A | 1/2005 |
| JP | 2-292589 | 12/1990 |
| JP | 04233609 A * | 8/1992 |
| JP | 6-109325 | 4/1994 |

* cited by examiner

WATER VALVE ASSEMBLY

BACKGROUND OF THE INVENTION

1. Field of the Invention

The present invention relates to a water valve assembly, in particular a water valve assembly having a compact and space-efficient layout in which effective mixing of water, for instance hot and cold water, may be achieved.

2. Description of the Related Art

Many different water-mixing valves have been proposed previously. One of the most straightforward designs uses two valves connected respectively to hot and cold water supplies and operated manually by traditional taps or faucets, but feeding a single outlet. It is known to attach a hose and shower handset to this outlet such that a user can control a desired outlet temperature by adjusting the two respective valves. In more recent years, particularly for use with showers, it has been known to provide a single valve arrangement, which simultaneously adjusts the flow of hot and cold water into a mixing chamber. This provides very convenient operation for the user. Such arrangements may use movable ceramic plates having holes therethrough which allow simultaneous adjustment of hot and cold water-flow into the mixing chamber. Also, thermostatic arrangements are known where a user selects a desired outlet water temperature and a thermostatic element causes movement of the mixing valve to maintain that outlet temperature.

EP-A-1 128 105 and EP-A-1 229 418 describe a water-mixing valve and its associated control system. In particular, the valve includes a rotatable valve plate having tapered throughholes adjacent respective hot and cold water inlets. The plate may be rotated by a motor under the control of the control system so as to adjust simultaneously the flows of hot and cold water, thereby to provide the desired outlet mixed water temperature.

OBJECTS AND SUMMARY OF THE INVENTION

The above-described electronically controlled water-mixing valve functions extremely well and provides good user operability. Objects of the invention include reducing the size of the valve assembly and providing greater functionality.

The present invention is based on a recognition that higher levels of functionality can be obtained by taking what would otherwise seem to be the retrograde step of returning to the use of independently controllable valves feeding a common mixing chamber. With more modern technology, using electronically controlled valves, the user need not be aware of the presence of two valves, thereby overcoming the prejudice against more traditional two-valve arrangements.

According to the present invention, there is provided a valve assembly including a first housing, a first inlet chamber defining a first water inlet for receiving a flow of water into the first inlet chamber, a first valve for controlling flow of water through the first inlet into the first inlet chamber and a mixing chamber connected to the first inlet chamber so as to receive water from the first inlet chamber. The mixing chamber defines a supplementary water inlet for receiving a supplementary flow of water and defines a mixed-water outlet from which a mixture of water from the first inlet chamber and the supplementary water inlet may be provided. The first inlet chamber and the mixing chamber are both provided within the first housing and are arranged one within the other.

This provides a very efficient use of space.

It should be appreciated that a traditional approach to providing respective hot and cold water valves would use respective inlet chambers feeding a mixing chamber or mixing outlet pipe in its own separate respective volume. This makes the overall volume undesirably large. Unfortunately, it is not possible merely to reduce the volume of all components, since, firstly, all of the flow paths must have a reasonably large cross-sectional area so as not to introduce undue pressure drops and, secondly, the mixing chamber must have a reasonably large flow length so that any temperature sensor in the mixed-water outlet is exposed to well-mixed water. The present invention takes advantage of the fact that, in practice, an inlet valve assembly will have a larger cross-sectional area than the cross-sectional area of the water inlet itself. Thus, the volume formed by extending the cross-sectional area of the valve assembly downstream of the valve assembly will be larger than is required for the flow of water from that valve assembly. The present invention takes advantage of this by providing the mixing chamber in the same housing as the inlet chamber.

According to the present invention, there is also provided a method of providing a water-mixing valve having separate valves for respective water inlets in a compact form, the method including providing in a first housing a first inlet chamber defining a first water inlet for receiving a flow of water into the first inlet chamber, a first valve for controlling flow of water through the first inlet into the first inlet chamber and a mixing chamber connected to the first inlet chamber so as to receive water from the first inlet chamber, the mixing chamber defining a supplementary water inlet for receiving a supplementary flow of water and defining a mixed-water outlet from which a mixture of water from the first inlet chamber and the supplementary water inlet may be provided and arranging the first inlet chamber and the mixing chamber one within the other.

According to the present invention, there is also provided a water valve assembly including a first housing containing a first inlet chamber defining a first water inlet, a first valve for controlling flow of water through the first water inlet and a mixing chamber defining a supplementary water inlet and a mixed-water outlet and a second housing containing a second inlet chamber defining a second water inlet and a supplementary water outlet connected to the supplementary water inlet and a second valve for controlling flow of water through the second water inlet. The supplementary water inlet is located in a first side of the first housing and the supplementary water outlet is located in a first side of the second housing, the first housing and the second housing being located side by side with their respective first sides adjacent each other. The water valve assembly has an inlet end and a control end opposite said inlet end and is arranged with the first and second housings both extending from the inlet end to the control end with the first and second water inlets and the first and second valves being located at the inlet end. The mixed-water outlet is located in a second side of the first housing, the first and second sides of the first housing being on opposite sides of the first housing.

By providing the mixed-water outlet in the first housing and arranging the first and second housings side by side in this manner, a compact and flat overall arrangement may be provided, making the overall arrangement particularly advantageous for installation in situations where a small depth is desired. Indeed, the depth of the assembly may be significantly reduced compared with previous arrangements using a single rotatable valve member for simultaneously controlling the two inlet flows. Furthermore, by providing the mixed-water outlet on the second side of the first housing opposite the first side adjacent the second housing, the overall length of the assembly between the inlet end and control end may be kept small. The mixed water can then be fed perpendicular to the flow of the inlet flows or, using an additional elbow joint or the like, parallel to the inlet flows. The arrangement also allows for all of the water fittings and flow to be provided on the inlet end of the assembly and all control and electrical components to be fitted on the control end of the assembly.

Preferably, the first and second housings both define respective control apertures for sealably receiving shafts for operating the respective first and second valves, the control apertures both being provided in the control end of the water valve assembly.

Thus, control of the first and second valves can be achieved, for instance by motors, from the control end of the water valve assembly.

Where the first inlet chamber and the mixing chamber are both provided within the first housing and are arranged one within the other, preferably, the first inlet chamber and the mixing chamber are substantially concentric.

This allows the flow in one chamber to occur evenly around the other chamber and is particularly advantageous where a shaft of some sort is provided centrally of the first housing to operate the first valve.

Preferably, one of the inlet chamber and the mixing chamber is substantially cylindrical and the other of the inlet chamber and the mixing chamber has an annular cross-section so as to be substantially tubular.

Again, this allows even flow in one chamber around the other with good symmetry and is particularly advantageous when some form of control shaft is to be provided centrally within the two chambers.

The first inlet chamber and mixing chamber may be provided separately within the first housing having their own respective walls. However, preferably, the first housing defines a first inner space and the water valve assembly further includes chamber walls dividing the inner space into the first inlet chamber and the mixing chamber. The chamber walls could be provided integrally as part of the first housing or, more preferably, are provided as an insert for the first inner space.

Preferably, the first housing has an inlet end, the first inlet is provided in the inlet end and the chamber walls extend from the inlet end so as to surround the first inlet such that the inlet chamber is formed within the chamber walls.

In this way, the first inner space of the first housing is divided by the chamber walls such that the first inlet feeds water into the chamber defined within the chamber walls. The chamber walls may meet at the inlet end with the downstream side of the first valve such that water flowing from the first valve flows directly into the inlet chamber formed within the chamber walls. The chamber walls may in themselves completely define the inlet chamber or, alternatively, may extend so as to meet with an inner surface of another portion of the first housing so as to define, together with the inner surface of the first housing, the first inlet chamber.

Preferably, the chamber walls define a mixing connection connecting the first inlet chamber to the mixing chamber.

In this way, water supplied to the first inlet chamber by the first valve flows on into the mixing chamber for mixing with water provided by means of the supplementary water inlet.

Preferably, the first housing has side walls extending from the inlet end substantially parallel to the chamber walls.

In this way, the mixing chamber formed between the chamber walls and the first housing has a generally tubular form and the mixing connection provided in the chamber walls faces the side walls of the first housing in a generally perpendicular manner.

Preferably, the supplementary water inlet is provided in the side walls of the first housing.

In this way, flow of water from the supplementary water inlet is introduced into the side of the tubular-shaped mixing chamber. The water is thus caused to move in two circumferential directions around either side of the chamber walls. This is particularly useful in promoting mixing of water.

Preferably, the supplementary water inlet is provided at a position substantially facing the mixing connection.

Thus, water from the supplementary water inlet is fed into the mixing chamber at substantially the same location as water is fed into the mixing chamber from the first inlet chamber. Mixing of the two water supplies is thus promoted.

Preferably, the mixed-water outlet is provided in the side walls of the first housing.

In this way, flow from the mixing chamber occurs from the side of the tubular volume formed for the mixing chamber. Since the inlet water-flows from the first inlet chamber and the supplementary water inlet are also both provided in the side of this tubular volume, all flow within the mixing chamber occurs substantially circumferentially around the chamber walls. This has been found to provide good mixing of the water for a relatively short flow-path distance and in a relatively small volume.

Preferably, the mixed-water outlet is provided at a position on an opposite side of the inlet chamber to the supplementary water inlet.

In this way, two equal-distance flows are provided either side of the chamber walls, thereby maximising the flow path whilst ensuring symmetric and consistent flow properties.

Preferably, the water valve assembly further includes a water-spreading feature forming the mixing connection, the water-spreading feature defining a plurality of mixing orifices in a radial array facing outwardly with respect to each other.

In this way, water flowing from the first inlet chamber into the mixing chamber is provided as a plurality of smaller flows, all flowing in different directions. This promotes mixing with the flow of water from the supplementary water inlet.

Preferably, each mixing orifice faces substantially along the portion of the chamber walls to which that respective mixing orifice is adjacent and each mixing orifice faces substantially perpendicular to the supplementary water inlet.

In this way, water entering the mixing chamber is already directed in a direction parallel to the chamber walls.

Water from the supplementary water inlet can similarly be provided as a plurality of flows parallel to the chamber walls so as to promote mixing of the water from the first inlet chamber and the supplementary water inlet.

Preferably, this is achieved by arranging the water-spreading feature to include a plurality of radially extending channels interspersed between the plurality of mixing orifices and facing the supplementary water inlet.

Water entering the mixing chamber from the supplementary water inlet flows into the channels between the plurality of mixing orifices and is forced to flow out of ends of those channels adjacent and interspersed between the plurality of mixing orifices. In this way, an array of flows, alternately from the first inlet chamber and the supplementary water inlet, may be provided in the mixing chamber generally parallel to the chamber walls.

Preferably, the water valve assembly further includes fins extending outwardly from the chamber walls into the mixing chamber and angled so as to promote mixing of streams of water from the inlet chamber and streams of water from the supplementary water inlet.

In general, the fins will be angled with respect to the natural direct flow path between the supplementary water inlet and the mixed-water outlet. This causes the streams of water from the inlet chamber and the supplementary water inlet to change in direction, thereby promoting mixing and also creating a vortex.

Preferably, the first valve includes a first disc having a first inner and a first outer surface and rotatable about a first axis, the first disc defining a first water valve opening extending between the first inner and first outer surfaces, the first valve opening having a first primary end and a first secondary end, the first valve opening extending along a circumferential path between the first primary and first secondary ends and the first valve opening having a radial extent which increases from the first primary end to the first secondary end. The first valve preferably also includes a first valve inlet sealing with the first outer surface at a radial position on the first circumferential path wherein the first valve is located within the first housing at the inlet end, the chamber walls extend from the inner surface and the valve opening and the valve inlet together define the first water inlet.

In this way, by rotating the first disc relative to the first valve inlet, the cross-sectional area provided by the first valve opening in conjunction with the first valve inlet for water-flow is varied and the amount of water-flow into the first inlet chamber can be controlled. Compared with previous arrangements where two similar valve openings are provided in a single disc and each valve opening controls flow from a respective inlet, the first disc can be constructed with a much smaller diameter, with the first valve opening extending along a circumference having a much smaller radius. Although, to achieve the same effect as the prior art, two discs are required, there is still an advantageous space consideration in that the two discs can be provided in an assembly that has a smaller depth than the prior-art single disc. Furthermore, there is a significant advantage in providing the first valve opening along a first circumferential path having a relatively small radius. It will be appreciated that frictional resistance between the first disc and the first valve inlet, which seals against its first outer surface, puts additional demands on any mechanism, such as a motor, for rotating the first disc. However, since the radius of the circumferential path of the first valve opening is smaller than that used in the prior art, any frictional resistance results in a much smaller torque resistance as compared with the prior art. It becomes unnecessary to use any friction reducing coatings on the disc. There is also reduced wear of any seals because the movement between such seals and the disc is less.

Preferably, the first housing has a control end to which the chamber walls extend, the control end defining a control aperture through which a shaft may be inserted sealably so as to extend through the first inlet chamber along the first axis and engage with the first disc to rotate the first disc.

Because the mixing chamber extends circumferentially around the inlet chamber and any shaft will extend through the first inlet chamber, control of the valve disc need not interfere with mixing of the water. Furthermore, as mentioned above, by providing a control end opposite to the inlet end, all water connections and components may be kept on an opposite side of the water valve assembly to any control or electrical components.

Preferably, the water valve assembly further includes
a second housing;
a second inlet chamber defining a second water inlet for receiving a flow of water into the second inlet chamber and defining a supplementary water outlet from which water from the second inlet chamber may be provided; and
a second valve for controlling flow of water through the second water inlet into the second inlet chamber; wherein
the second inlet chamber is provided within the second housing and the supplementary water outlet of the second housing is connected to the supplementary water inlet of the first housing.

It will be appreciated that the second housing can take the same form as the first housing, but operates only as an inlet chamber, rather than as an inlet chamber and as a mixing chamber, by omitting the chamber walls. In this way, tooling and production costs may be reduced. The second housing may be provided separately from the first housing for connection thereto or may be provided with the first housing as an integral unit.

Preferably, the second valve includes
a second disc having a second inner and a second outer surface and rotatable about a second axis, the second disc defining a second valve opening extending between the second inner and second outer surfaces, the second valve opening having a second primary and a second secondary end, extending along a second circumferential path between the second primary and secondary ends and having a radial extent which increases from the second primary end to the second secondary end; and
a second valve inlet sealing with the second outer surface at a radial position on the second circumferential path; wherein
the second valve is located within the second housing at an inlet end.

Again, the second valve may take the same form as the first valve, thereby reducing tooling and production costs. Irrespective, the second valve has the same advantages as those discussed above for the first valve.

Preferably, the inlet end of the first housing and the inlet end of the second housing face in the same direction and are provided on one side of the water valve assembly.

Thus, water connections for both the first and second housing can be provided on the same side of the assembly, that side being opposite to any control connections.

In this respect, the second housing preferably has a control end defining a second control aperture to which a shaft may be inserted sealably so as to extend through the second inlet chamber along the second axis and engage with the second disc to rotate the second disc. The control end of the first housing and the control end of the second housing preferably face in the same direction and are provided on another side of the valve assembly opposite the one side.

Preferably, the first axis and the second axis are substantially parallel.

In this way, any control mechanisms, such as control motors, may be provided side by side in a convenient manner.

Preferably, as mentioned above, the first and second housings include a common integral body.

Having recognised the possibility of a water mixing valve using individually and separately controllable hot and cold water valve inlets, the present application then recognises the possibility of controlling such a water mixing valve in an advantageous manner. The water mixing valve preferably includes a water valve assembly as described above.

According to the present invention, there is provided a method of controlling a water mixing valve having a water outlet with an outlet water temperature sensor and having separately operable hot and cold water inlet valves, the method including controlling the hot and cold water inlet valves to respective states which provide water in the water outlet having a temperature, as sensed by the outlet water temperature sensor, selected by a user, upon detection by the outlet water temperature sensor of an outlet temperature less than that selected by the user, controlling the hot and cold water inlet valves to provide progressively a higher proportion of hot water in the water outlet, judging whether or not the hot water inlet valve has been in a state to provide maximum flow of hot water in the water outlet for a predetermined period and, if the hot water inlet valve has been in the state to provide maximum flow of hot water in the water outlet for the predetermined period whilst the outlet temperature remains less than that selected by the user, moving the hot and cold water inlet valves to states to provide a mixture of hot and cold water in the water outlet.

According to the present invention, there is also provided a controller for a water mixing valve having a water outlet with an outlet water temperature sensor and having separately operable hot and cold water inlet valves, the controller including an input for receiving a signal from the outlet water temperature sensor and respective outputs for operating the hot and cold water inlet valves. The controller is arranged to control the hot and cold water inlet valves to respective states which provide water in the water outlet having a temperature, as sensed by the water outlet temperature sensor, selected by a user, upon detection by the outlet water temperature sensor of an outlet temperature less than that selected by the user, to control the hot and cold water valve inlets to provide progressively a higher proportion of hot water in the water outlet, to judge whether or not the hot water inlet valve has been in a state to provide maximum flow of hot water in the water outlet for a predetermined period and, if the hot water inlet valve has been in the state to provide maximum flow of hot water inlet in the water outlet for the predetermined period whilst the outlet temperature remains less than that selected by the user, to move the hot and cold water inlet valves to states to provide a mixture of hot and cold water in the water outlet. In this way, if for any reason there is a failure in the hot-water supply, the water mixing valve, having first followed the normal operation of trying to increase the relative flow of hot water, is returned to a mixed water state. Thus, when the hot water supply is restored, the user is not provided with an excessively hot water supply whilst the water mixing valve is moved back to its mixed water state.

In one embodiment, having detected the hot-water supply failure, the water mixing valve is moved to a predetermined mixed water state. In another embodiment, the hot and cold water valve inlets are moved back to their respective states before the outlet water temperature sensor detected a temperature less than that selected by the user.

According to the present invention, there is provided a controller for a water mixing valve having a water outlet with an outlet water temperature sensor and having separately operable hot and cold water inlet valves, the controller including an input for receiving a signal from the outlet water temperature sensor and respective outputs for operating the hot and cold water inlet valves between closed and fully open states. The controller is arranged to control the hot and cold water inlet valves to respective states which provide water in the water outlet having a temperature, as sensed by the water outlet temperature sensor, selected by a user, to detect failure of a cold water supply supplying cold water to the cold water inlet according to the signal from the outlet water temperature sensor and, upon detection of a cold water supply failure, to move the hot water inlet valve to a closed state and to move the cold water inlet valve to an intermediate state between a closed state and a fully open state.

According to the present invention, there is also provided a method of controlling a water mixing valve having a water outlet with an outlet water temperature sensor and having separately operable hot and cold water inlet valves, the method including controlling the hot and cold water inlet valves to respective states from closed to fully open states which provide water in the water outlet having a temperature, as sensed by the outlet water temperature sensor, selected by a user, detecting failure of a cold water supply supplying cold water to the cold water inlet according to the temperature sensed by the outlet water temperature sensor and upon detection of a cold water supply failure, moving the hot water inlet valve to a closed state and moving the cold water inlet valve to an intermediate state between a closed state and a fully open state.

Cold-water failure is well known as a serious problem for thermostatically controlled showers. It will be appreciated that, once a cold water supply has failed entirely or dropped significantly in pressure, a user will be presented with only hot or at least almost entirely hot water, which can be dangerous to that user. It is known in the prior art to provide means for detecting such cold-water failure. However, in the prior art, even where cold-water failure is detected, it is only possible to turn off the water supply entirely or fully close the hot water inlet valve whilst fully opening the cold water inlet valve. According to the present invention, however, it is possible to close the hot water inlet valve but only reduce the inlet aperture of the cold water inlet valve. This is highly advantageous in that, when the cold water supply is restored, the user is provided with only a small spray of cold water. The user is not subjected to the cold water shock produced with the prior art. It also allows the controller to smoothly and more quickly return the water mixing valve to its normal operating state by opening the hot water inlet valve and, if necessary, further opening the cold water inlet valve.

The intermediate state of the cold water inlet valve is preferably no more than halfway from the closed state to the fully open state.

Preferably, the controller is provided together with a water mixing valve and the water mixing valve includes a water valve assembly as described above.

The present application also recognises the potential advantages in using a water mixing valve with separately controllable hot and cold water inlet valves in a system where the hot water supply is provided by an instantaneous water heater such as is commonly known as a combi boiler. Often such heaters are arranged to turn themselves on in response to detecting a certain through-flow of water. Furthermore, such water heaters provide a limited range of output power, if not a constant output power. To prevent the water passing through the heater from being overheated, possibly to the point of boiling, it is necessary for flow through the heater to be at or beyond a minimum. Below a predetermined minimum flow through the heater, the heater is arranged to turn off and stop any further heating. This can cause significant problems when water mixing valves are used with small hot water flow rates.

According to the present invention, there is provided a method of controlling a water mixing valve for use with a hot water supply provided by an instantaneous water heater requiring at least a minimum flow of water to enable heating of the water provided as the hot water supply, the water mixing valve having a water outlet with an outlet water temperature sensor and having separately operable hot and cold water inlet valves, the method including controlling the hot water inlet valve such that water flow through the hot water inlet valve is at least said minimum flow.

According to the present invention, there is also provided a controller for a water mixing valve for use with a hot water supply provided by an instantaneous water heater requiring at least a minimum flow of water to enable heating of the water provided as the hot water supply, the water mixing valve having a water outlet with an outlet water temperature sensor and having separately operable hot and cold water inlet valves, the controller including an input for receiving a signal from the outlet water temperature sensor and respective outputs for operating the hot and cold water inlet valves. The controller is arranged to control the hot water inlet valve such that water flow through the hot water inlet valve is at least said minimum flow.

In this way, the water mixing valve never reduces the hot water flow rate to a point at which the instantaneous water heater stops heating the hot water supply. Control of water temperature in this range can be achieved merely by increasing cold water supply, rather than reducing hot water supply any further.

According to the present invention, there is also provided a method of controlling a water mixing valve for use with a hot water supply provided by an instantaneous water heater having a maximum output power such that flow through the instantaneous water heater greater than the maximum flow results in a reduced hot water supply temperature, the water mixing valve having a water outlet with an outlet water temperature sensor and having separately operable hot and cold water inlet valves, the method including controlling the hot water inlet valve such that water flow through the hot water inlet valve is no more than said maximum flow.

According to the present invention, there is also provided a controller for a water mixing valve for use with a hot water supply provided by an instantaneous water heater having a maximum output power such that flow through the instantaneous water heater greater than a maximum flow results in a reduced hot water supply temperature, the water mixing valve having a water outlet with an outlet water temperature sensor and having separately operable hot and cold water inlet valves, the controller including an input for receiving a signal from the outlet water temperature sensor and respective outputs for operating the hot and cold water inlet valves. The controller is arranged to control the hot water inlet valve such that water flow through the hot water inlet valve is no more than said maximum flow.

In this way, the water mixing valve will never increase the flow of water through the water heater beyond the point at which the hot water supply temperature decreases. In the past, it was necessary to fit flow restrictors in the water pipes to prevent such flows. However, with the present invention, the same effect can be achieved without the need for such restrictors.

It will be appreciated that the methods of restricting minimum and maximum hot water flow can be implemented together. Similarly, they can be implemented with the arrangements described above.

It would be possible to provide the controller with one or more user inputs allowing the user to select manually the minimum/maximum flows. However, preferably, the controller is arranged to conduct a learning process by which it learns the appropriate minimum and maximum flows.

Preferably, a user interface is provided enabling a user to indicate selectively whether or not the hot water supply to which the water mixing valve being controlled by the controller is connected is provided by an instantaneous water heater.

In this way, a controller for a water mixing valve can be provided for a variety of installations including hot water supplies with and without instantaneous hot water heaters. When the controller is to be used with a hot water supply provided by an instantaneous water heater, the user interface enables a user to indicate this to the controller such that it can operate accordingly, for instance implementing the learning processes discussed above.

DETAILED DESCRIPTION OF THE PREFERRED EMBODIMENTS

The invention will be more clearly understood from the following description, given by way of example only, with reference to the accompanying drawings.

Figure 1:
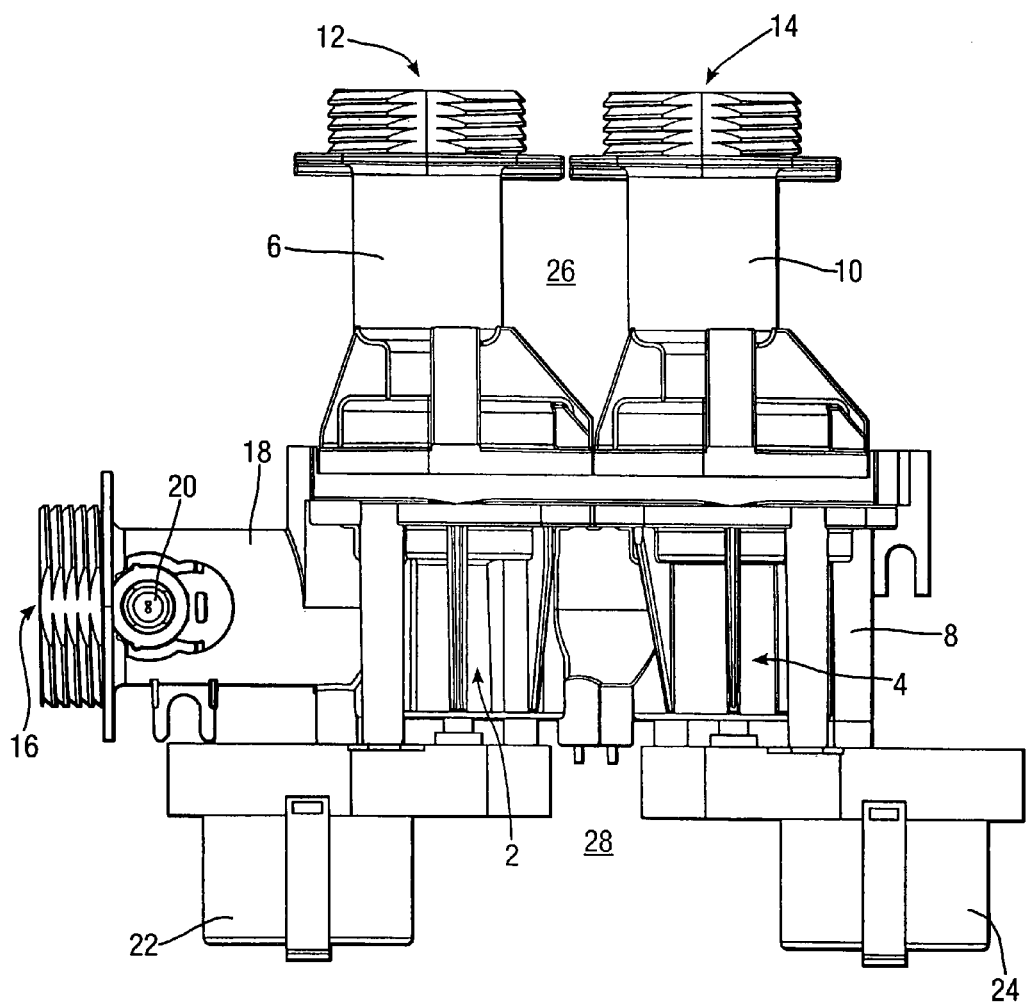
FIG. 1 illustrates an overall water valve assembly embodying the present invention.

A water valve assembly embodying the present invention is illustrated in FIG. 1. The assembly includes a first housing 2 and a second housing 4. In the illustrated embodiment, the first and second housings 2, 4 are constructed respectively from a first inlet body 6 attached to a single integral main body 8 and a second inlet body 10 attached to the main body 8. The first housing 2 includes a first inlet 12 provided in the first inlet body 6 for receiving a first water supply and the second housing 4 includes a second inlet 14 provided in the second inlet body 10 for receiving a second water supply. The first housing 2 is also provided with an outlet 16. In the illustrated body, the outlet 16 is provided at the downstream end of an outlet body 18 formed integrally with the main body 8, but it will be appreciated that the outlet body 18 could be formed as a separate component attached to the main body 8.

As will be described below, the first housing 2 and second housing 4 include respective first and second valves, which can be operated to control the flow of water into the water valve assembly. In a preferred embodiment, a temperature sensor 20 is provided in the outlet flow of mixed water and the valves can be controlled so as to select a predetermined mixed outlet water temperature. As illustrated, the temperature sensor 20 is provided towards the downstream end of the outlet body 18.

To control the respective valves, first and second control motors 22, 24 are attached to the water valve assembly.

As illustrated in FIG. 1, the water valve assembly can be considered to have an inlet end 26 at which the first and second inlets 12, 14 are located, and a control end 28 at which any control components, such as the motors 22, 24, are located. This enables any water connections to be kept separate from any control or electrical connections.

As illustrated, the first and second housings 2, 4 are located side by side, both extending from the inlet end 26 to the control end 28. The outlet 16 is then provided on a side of the first housing 2 opposite to its side joining the second housing 4. Indeed, the outlet 16 faces away from, in other words in an opposite direction to, the second housing 4.

Thus, the overall water valve assembly has a generally flat configuration having a relatively small depth, the depth being measured perpendicular to both the extent between the inlet end 26 and control end 28 and the extent between the outlet 16 and second housing 4.

Figure 2:
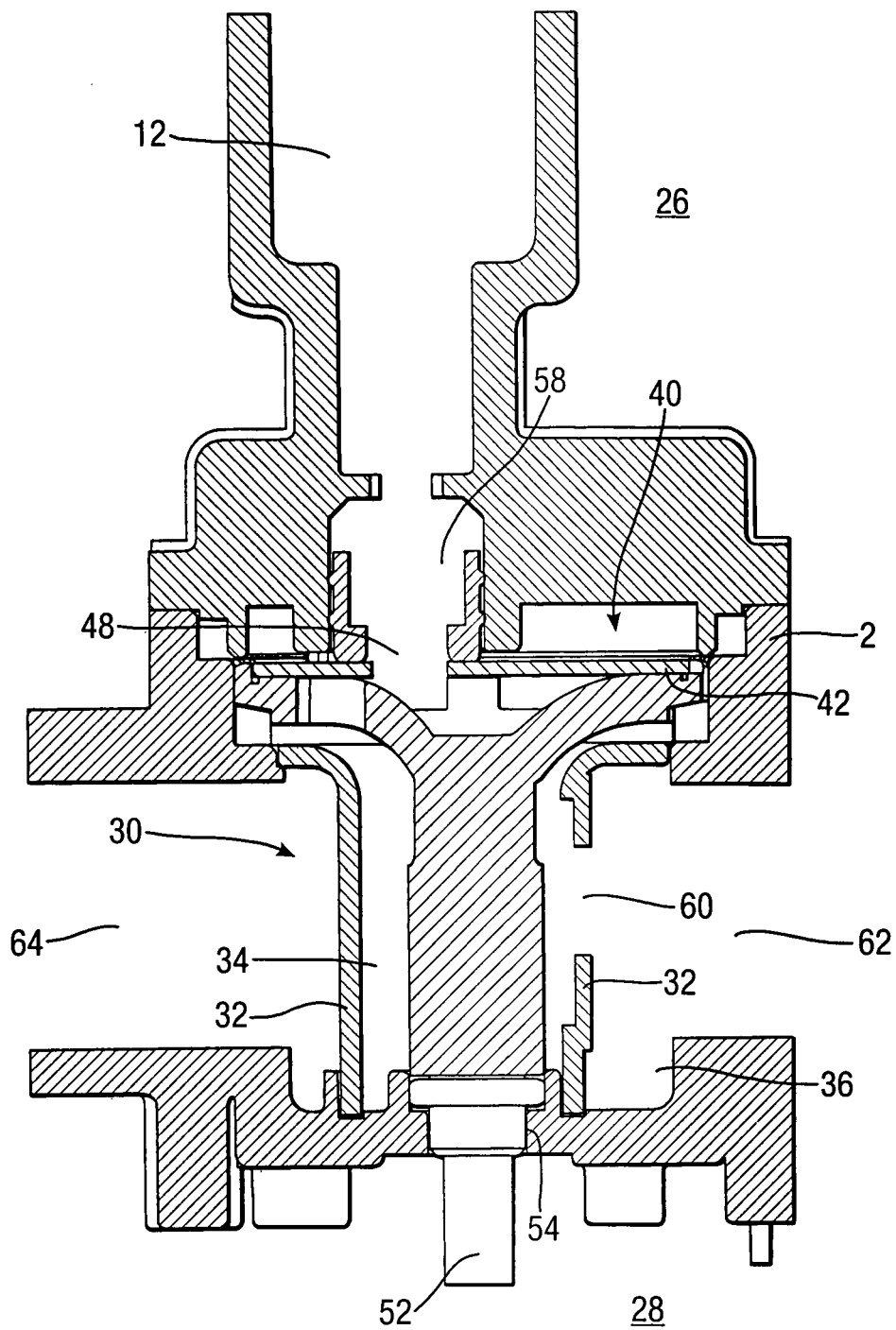
FIG. 2 illustrates a cross-section through a water valve assembly embodying the present invention.

FIG. 2 illustrates a cross-section through a first housing.

The first housing 2 defines an inner space 30 having chamber walls 32 which divide the inner space 30 into a first inlet chamber 34 and a mixing chamber 36. In this respect, the chamber walls 32 surround and define the first inlet chamber 34 such that the first inlet chamber 34 is provided within the mixing chamber 36.

It will be appreciated that other arrangements are possible where a mixing chamber is provided within an inlet chamber.

In the illustrated embodiment, the first housing 2 extends from the inlet end 26 to the control end 28 along a central first axis. In this embodiment, the chamber walls 32 extend around that axis in a generally cylindrical manner. Thus, the first inlet chamber and the mixing chamber are substantially concentric and, furthermore, while the first inlet chamber is substantially cylindrical, the mixing chamber has an annular cross-section so as to be substantially tubular.

It will be appreciated that other non-concentric and non-cylindrical arrangements are also possible, but that the arrangement of the illustrated embodiment is particularly advantageous in providing good flow and mixing of water.

A first valve 40 is provided at the inlet end 26 of the first housing 2. The first valve 40 is used to control the flow of water from the inlet 12 into the first inlet chamber 34. In the illustrated embodiment, the first valve itself defines with the chamber walls 32 the first inlet chamber 34 and, hence, defines a first water inlet into the first inlet chamber 34.

Figure 3:
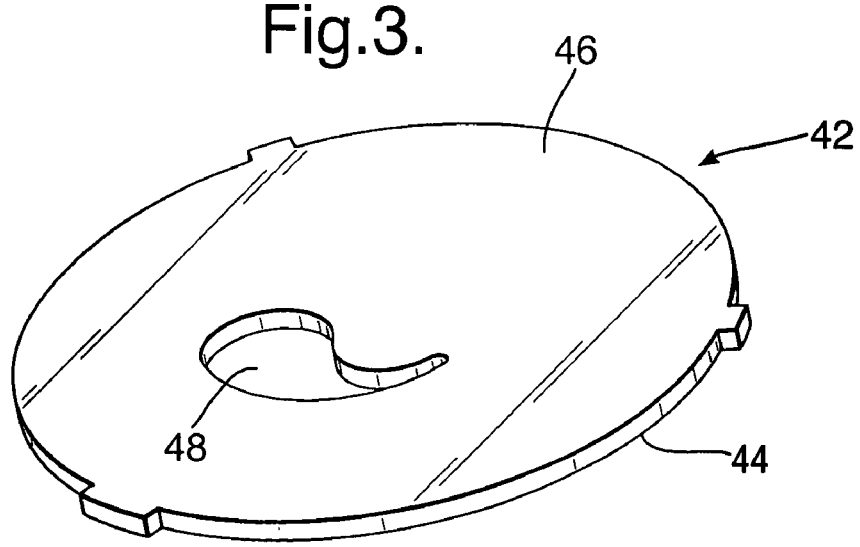
FIG. 3 illustrates a valve disc for use in an embodiment of the present invention.

In the illustrated embodiment, the first valve 40 includes a first disc 42 as illustrated in FIG. 3. The first disc 42 has a first inner surface 44 and a first outer surface 46. Between the inner and outer surfaces 44, 46 there is defined a first valve opening 48 having a tapered form. In particular, the first valve opening 48 extends along a circumference and gradually widens from one end to the other. In the arrangement of FIG. 2, the first valve opening is used to define the cross-sectional area of the first water inlet to the first inlet chamber 34.

Figure 4:
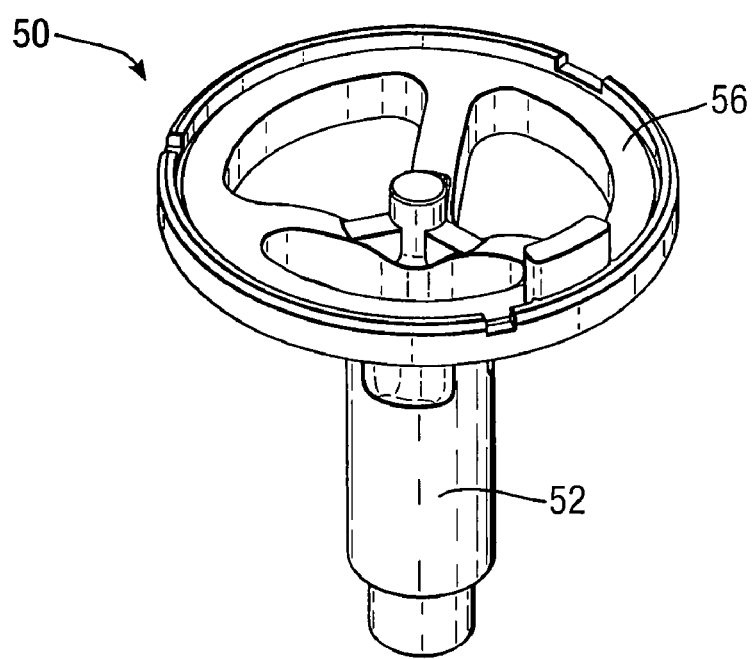
FIG. 4 illustrates a valve disc support member for use in an embodiment of the present invention.

In the illustrated embodiment, the valve disc 42 is fitted to a support member 50 as illustrated in FIG. 4.

The support member 50 includes a shaft 52, which, as illustrated in FIG. 2, is positioned along the axis of the first housing 2. The shaft 52 extends through a lower wall of the housing 2 at the control end 28, in particular through a control aperture 54 which seals with the shaft 52 to provide a water-tight seal.

As illustrated, at the end of the shaft 52 opposite to the end passing through the control aperture 54, an open platform 56 is provided for supporting the valve disc 42. In particular, by rotating the shaft 52 relative to the housing 2, it is possible also to rotate the valve disc 42.

As illustrated in FIG. 2, the first valve 40 also includes a first valve inlet 58 in fluid connection with the inlet 12 and sealing against the outer surface 46 of the first valve disc 42. Appropriate seals may be provided according to various seals known in the prior art. The first valve inlet 58 is provided at an off-axis position within the housing 2 corresponding to the position of the circumference along which the first valve opening 48 extends. Thus, as the shaft 52 and first valve disc 42 are rotated, the open cross-sectional area of the first valve opening 48 presented to the first valve inlet 58 will vary such that flow of water into the first inlet chamber can be controlled. In this respect, it will be appreciated that the first valve inlet 58 has an extent in the circumferential direction which is significantly less than the full circumferential length of the first valve opening 48.

It should be appreciated that, since the first valve opening 48 runs along a circumference outside the rotational centre of the first valve disc 42, it is alternatively possible to provide a supporting and controlling shaft which extends axially and engages with the first valve disc 42 only at its centre, rather than by means of the open platform 56 illustrated in FIG. 4.

In the embodiment illustrated in FIG. 2, the first inlet chamber 34 connects to the mixing chamber 36 by means of an aperture in the chamber walls 32 forming a mixing connection 60. In this way, water flows from the first inlet chamber 34 into the mixing chamber 36.

FIG. 2 also illustrates a supplementary water inlet 62 in the mixing chamber 36. In the illustrated embodiment, the outer surface of the mixing chamber 36 is formed from inner walls of the housing 2. As illustrated, the inner walls of the housing 2 define the supplementary water inlet 62 and this faces inwardly of the mixing chamber 36 directly towards the mixing connection 60.

In use, water flows into the mixing chamber 36 in direct opposition to water flowing from the mixing connection 60 into the mixing chamber 36. The two flows of water then flow through the mixing chamber 36 around the chamber walls 32. The mixing chamber 36 is provided with a mixed-water outlet 64 which, like the supplementary water inlet 62, is defined by the inner walls of the housing 2 forming the mixing chamber 36.

In the illustrated embodiment, the mixed-water outlet 64 is diametrically opposed to the supplementary water inlet 62 and also the mixing connection 60. Thus, flows from the mixing connection 60 and supplementary water inlet 62 can flow either side and around the inlet chamber 34 defined by the chamber walls 32.

This arrangement provides for good mixing of two flows of water whilst minimising overall volume. In particular, it will be noted that the overall cross-sectional area of the first valve 40 is larger than the cross-sectional area required for the flow of water. Thus, extending the volume of a housing with the cross-sectional area of the valve 40 provides redundant volume. The arrangement described above with reference to FIG. 2 makes use of this otherwise redundant volume to provide a mixing chamber 36 around the outside of the inlet chamber 34. Furthermore, it allows what would otherwise be a counter-intuitive flow arrangement, where a supplementary water inlet and a mixed-water outlet are provided in diametric opposition across the axis of a variable flow inlet. A compact arrangement is achieved while still providing effective mixing of the two inlet water supplies. This is particularly advantageous in allowing the arrangement of FIG. 1.

The arrangement also allows a temperature sensor, such as temperature sensor 20, to be located at a position physically close to the inlet 12. This is possible because, within the relatively small volume of the housing 2, a relatively long and effective mixing path is provided for water from the first inlet chamber 34.

Figure 5:
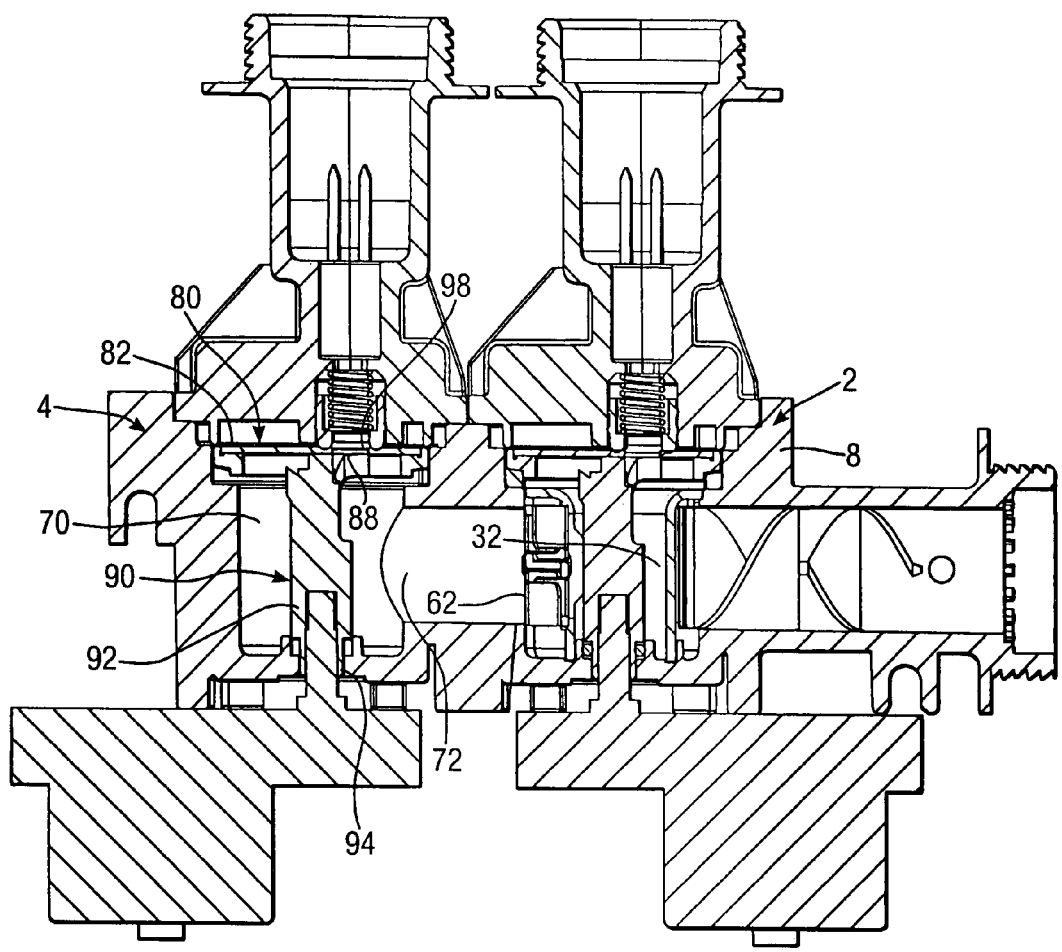
FIG. 5 illustrates another embodiment of the present invention.

FIG. 5 illustrates a cross-section through an arrangement having first and second housings such as illustrated in FIG. 1. This embodiment includes advantageous features which could be used as alternatives in the embodiment of FIG. 2.

As illustrated, the second housing 4 defines an inner space forming a second inlet chamber 70. No chamber walls are provided, such that no mixing chamber is provided.

The walls of the second housing 4 and, hence, the walls of the second inlet chamber 70 define a supplementary water outlet 72, which connects directly to the supplementary water inlet 62 of the first housing 2.

In the illustrated embodiment, the first housing 2 and second housing 4 are formed using a common integral main body 8 such that the supplementary water outlet 72 and supplementary water inlet 62 are, in effect, opposite ends of a common integral passageway joining the second inlet chamber 70 to the mixing chamber 36.

The second housing 4 houses a second valve 80 with an associated support member 90. In a preferred embodiment, the second housing 4 has the same dimensions as the first housing 2. This makes tooling and production of the first and second housings 2, 4 more straightforward. Furthermore, it means that the second valve 80 and second support member 90 can be identical in form to the first valve 40 and first support member 50. Thus, in this embodiment, the second valve 80 includes a second valve disc 82 identical to the first valve disc 42 illustrated in FIG. 3 and having a second valve opening 88 which operates to control flow from the inlet 14 into the second inlet chamber 70.

Similarly, in this embodiment, the second support member 90 is identical to the first support member 50 illustrated in FIG. 4 and includes a shaft 92 which is located along a second axis forming the central axis of the second housing 4. The housing 4 defined at its control end 28 a second control aperture 94 through which the shaft 92 may extend. Thus, the second valve 80 may be operated by means of the second shaft 92 extending through the second control aperture 94 of the second housing 4 at the control end 28.

The second valve inlet 98 seals with the outer surface of the second valve disc 82.

Figure 6:
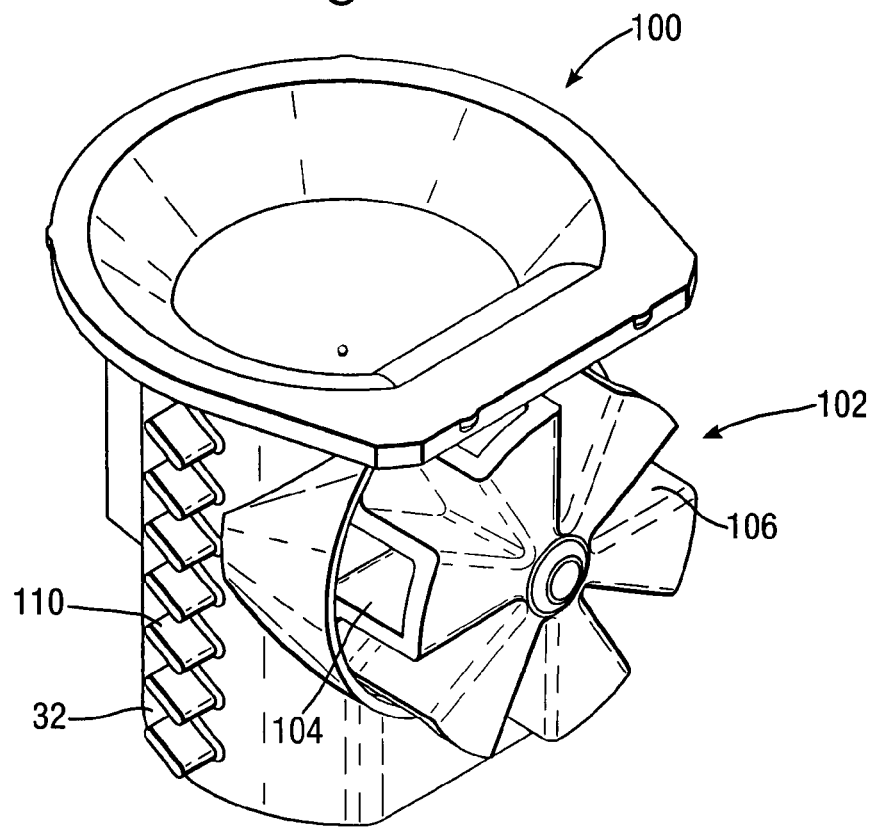
FIG. 6 illustrates an insert that may be used in an embodiment of the present invention.

FIG. 6 illustrates an insert 100 which is used in the embodiment of FIG. 5 (and could be used in the embodiment of FIG. 2) to form the chamber walls 32.

The insert 100 has a generally cylindrical form and is inserted centrally with respect to the first axis of the first housing 2. Its side walls extend down to the lower surface of the first housing 2 at the control end 28 so as to form the chamber walls 32 and define the first inlet chamber 34. In the illustrated embodiment, towards the inlet end 26 of the first housing 2, the walls have a tapered or generally conical form so as to spread out towards the inner side walls of the first housing 2 and accommodate the support platform 56 of the first support member 50. Of course, with a different support for the first valve disc 42, it would also be possible for the chamber walls 32 of the insert 100 to extend directly up to the inner surface 44 of the first valve disc 42. Of course, where the chamber walls 32 meet the inner surface 44 of the first valve disc 42, it must be at a circumference outside any portion of the first valve opening 48.

As illustrated in FIGS. 5 and 6, the mixing connection of the insert 100 is provided with a water-spreading feature 102. The water-spreading feature 102 includes a plurality of mixing orifices 104 arranged in a radial array facing outwardly with respect to each other. Thus, water from the first inlet chamber 34 is divided into a plurality of water-flows having relatively small cross-sections which are directed into the mixing chamber 36 in an outwardly flowing radial pattern.

Considering the water-mixing feature 102 from the mixing chamber 36 side of the chamber walls 32, the water-spreading feature 102 can be considered as a generally circular extension of the chamber walls 32, with a plurality of radially extending channels indented to the level of the chamber walls 32. Thus, these channels 106 divide the water-mixing feature 102 and, on the side of the first inlet chamber 34, create a corresponding interspersed set of channels feeding the plurality of orifices 104. The orifices 104 are orientated generally perpendicular to the chamber walls 32 and, hence, face in a direction generally parallel to the chamber walls 32. In this way, flow from the first inlet chamber 34 out of the plurality of orifices 104 is directed along the surface of the chamber walls 32. The provision of a plurality of streams of water in this way promotes mixing with water from the supplementary water inlet.

Considering FIG. 6 in conjunction with FIG. 5, it will be appreciated that the channels 106 interspersed between the plurality of orifices 104 face the supplementary water inlet 62. The radial array of channels 106 also result, at their outer ends, in openings facing in a direction along the surface of the chamber walls 32. Flow of water from the supplementary water inlet 62 is directed into the radially extending openings of the channels 106 and is then forced out of the outer radial ends of the channels 106 facing along the chamber walls 32.

In this way, the water-spreading feature 102 forms a radial array of water-flows from the first inlet chamber 34 interspersed with a corresponding plurality of radial water-flows from the supplementary water inlet 62. This results in a highly efficient way of promoting mixing between the two flows of water.

As will be appreciated, the interspersed flows of water are then forced to flow around either side of the chamber walls 32. This circumferential flow of water is highly effective in promoting the mixing of the streams, such that a good mixed water-flow is provided at the mixed-water outlet 64.

In the illustrated embodiment, the chamber walls 32 are additionally provided with mixing fins 110. These extend outwardly from the chamber walls 32 into the mixing chamber 36.

As illustrated, the fins 110 are provided approximately halfway along the flow path from the mixing connection and the mixed-water outlet 64. However, they can be placed at other positions along the flow path in addition or alternatively to the positions illustrated. Similarly, as illustrated, the fins are positioned as an axially extending array from the inlet end 26 to the control end 28. However, they can also be arranged in other arrays.

It will be appreciated that, given the dimensions and relative positions of features of a particular embodiment and, indeed, water pressures and flow rates, the water-flows from the mixing connection and supplementary water inlet 62 will follow particular paths around the chamber walls 32 to the mixed-water outlet 64. The fins 110 are positioned to interfere with and redirect those flows so as to promote further mixing. In the illustrated embodiment, the fins are all orientated at the same angle, that angle being neither perpendicular, nor parallel to the axis of the first housing 2, chamber walls 32 and, hence, mixing chamber 36. However, it may be found in certain embodiments that it is most efficient for different fins to be provided at different angles.

Although the water spreading feature 102 and the fins 110 have been described with reference to the insert 100 shown in FIG. 6, it should be appreciated that these features could be provided in other ways, for instance as part of their own inserts or formed integrally with other features of the assembly.

In one preferred embodiment, the water-spreading feature 102 of FIG. 5 can be replaced by a mixing connection which extends from the chamber walls 32 through the supplementary water inlet 62 and at least into the passage joining the supplementary water inlet 62 to the supplementary water outlet 72. Indeed, it could extend through the supplementary water outlet 72 into the second inlet chamber 70. In this way, the water mixing chamber 36 is effectively extended along the passageway joining the supplementary water inlet 62 to the supplementary water outlet 72 in the space outside the extension of the water connection. By extending the water-mixing chamber 36 in this way, the length of flow where the two streams are mixed is increased and, hence, the quality of the mixed water at the mixed-water outlet 64 can be improved.

Figure 7:
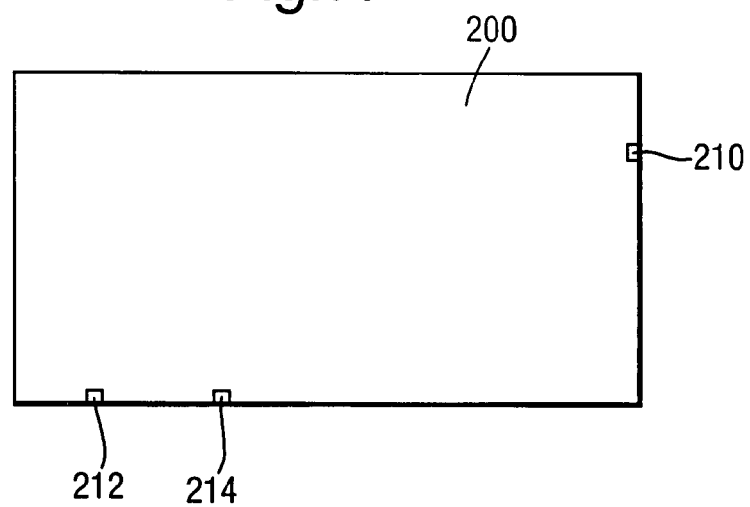
FIG. 7 illustrates a controller for use with a water mixing valve.

Using a water mixing valve having independently controllable hot and cold water inlet valves allows a number of control methods which have not previously been contemplated. A controller 200, such as illustrated in FIG. 7, can be used to control the water mixing valve and implement these various methods.

As illustrated, the controller 200 includes an input for receiving a signal from a water temperature sensor in the water outlet of the water mixing valve. It also includes outputs 212 and 214 for controlling respective hot and cold water inlet valves, for instance in the embodiment of FIG. 1 by means of motors 22 and 24.

It is possible that the hot water supply provided to the water mixing valve is interrupted in some way. This could be one or more of a failure in water pressure or a failure in heating the water. The controller will usually react to changes in the temperature sensed by the outlet water temperature sensor to open the hot water inlet valve and possibly close the cold water inlet valve. In this way, the controller aims to provide progressively a higher proportion of hot water at the water outlet so as to restore the water outlet temperature to the desired temperature.

If the hot water valve reaches its maximum open position and its detected outlet water temperature is still below that intended, after a predetermined (and probably short) period of time, the controller can conclude that a hot water supply failure has arisen. Having reached this judgement, the controller operates the hot and cold water inlet valves to return to an intermediate mixed setting. This setting provides a mixture of hot and cold water to the water outlet. Hence, as soon as the hot water supply is restored, the water outlet provides a mixture of hot and cold water and not only hot water as would have occurred with prior-art systems.

Upon detecting a hot water supply failure, the controller may be configured to move the hot and cold water inlet valves to respective predetermined intermediate positions. Alternatively, the controller can be configured to move the hot and cold water inlet valves back to the respective positions in which they were found before the controller detected that the outlet temperature had moved to a temperature less than that selected by the user. This provides a highly advantageous way of returning the outlet water temperature to that required by the user in the case of a short interruption of the hot water supply.

It will be appreciated that it is also possible for there to be a cold water supply failure. As with the hot water supply failure, this could be a complete lack of water supply or a drop in pressure.

Cold water supply failure can be a serious and dangerous problem for users, because it can result in a user being provided with nothing but hot water. In view of this, various systems are known from the prior art for detecting cold water supply failure and taking action to protect the user. In the case of a simple thermostatic shower, the controller will naturally attempt to increase the proportion of cold water relative to hot water, such that in many arrangements the hot water supply may be shut off completely. However, since the cold water valve will be in a fully open state, upon restoration of the cold water supply, the user is then provided with cold water from a fully open cold water inlet. This is undesirable for the user.

It is also possible for a controller, having detected a cold water supply failure, to shut off a water mixing valve entirely, closing flow from both water inlets.

It is now proposed that, once a cold water supply failure is detected (for instance by means of any method known in the prior art), the controller 200 moves the cold water mixing valve by means of output 214 to an intermediate state between a closed state and a fully open state. In this way, as with the prior art, the user is provided with protection from a fully hot water-outlet. However, when the cold water supply is restored, unlike prior-art arrangements, the user is not subjected to full-flow cold water from a fully open cold water inlet valve.

In one embodiment, in a manner similar to detection of hot water failure, the controller 200 can judge whether or not the cold water inlet valve has been in a state to provide maximum flow of cold water for a predetermined period and, if it has been in that state for the predetermined period whilst the outlet temperature remains more than that selected by the user, to determine that there has been a cold water supply failure.

The exact position of the intermediate state is not essential to the invention and is required only to provide a very small flow of water so as to alert the user to the fact that the cold water supply has been restored and to allow the system including the controller once again to control the hot and cold water inlet valves on the basis of the signal from the outlet water temperature sensor to provide an appropriate outlet water temperature. In particular, the controller can use the output 212 to once again open the hot water inlet valve. If necessary, the cold water inlet valve can also be controlled by output 214 to open up further and increase the overall flow at the outlet.

By way of example, the intermediate state used for the cold water inlet valve is preferably no more than halfway between its closed state and its fully open state, for instance providing 50% flow. More preferably, the intermediate state can be arranged to provide no more than 25% of full flow of the cold water.

Water mixing valves are often used in systems where the hot water supply is provided by means of an instantaneous water heater, for instance what is commonly known as a combi boiler. Heaters such as these respond to a flow of water through the heater and turn on a power supply, for instance electrically or gas-powered, for heating the through-flow of water. These heaters require a minimum flow of water before the power supply is turned on and heat is provided to the water. When using a water mixing valve to mix a relatively small amount of hot water into the water outlet (particularly in warmer summer months), there is a danger that the hot water inlet valve will restrict water flow to the point that the instantaneous water heater provides no heat to the water at all. Of course, having sensed a drop in water outlet temperature, the water mixing valve controller will open the hot water inlet valve such that the instantaneous water heater is switched on and again provides heat to the hot water supply. The system will then cycle between these two states.

To prevent this situation, it is proposed to control the hot water inlet valve such that it does not restrict water flow below the minimum required by the instantaneous water heater.

A user could provide directly to the controller information as regards the minimum flow, for instance by means of some control input. However, in a preferred embodiment, the controller is able to conduct a learning process. In particular, upon sensing a drop in water temperature for positions of the hot water inlet valve below a minimum value, the controller will learn where that minimum value is and avoid moving the hot water inlet valve below that position during normal use. If lower outlet water temperatures are required, the controller, instead of closing the hot water inlet valve further, merely opens the cold water inlet valve.

It will also be appreciated that instantaneous water heaters have a finite power and can only provide so much heat to water flowing through them. If the flow rate through an instantaneous water heater increases too much, the heater is unable to provide enough power or heat to the water and the resulting hot water supply has a reduced temperature.

It is proposed that the extent to which the hot water inlet valve is opened is restricted to ensure that the flow of water through the instantaneous water heater does not exceed the flow beyond which the water temperature starts to drop.

A user could provide an input to the controller to indicate the maximum to which the hot water inlet valve can open. However, in a preferred embodiment, the controller operates a learning process by which it learns the maximum position to which the hot water inlet valve can be opened. In particular, by progressively opening the hot water inlet valve so as to increase the flow of hot water, the controller judges at what point the temperature of the hot water supply starts to decrease. The controller then judges this position as the maximum to which the hot water inlet valve can be used during normal use. If higher outlet water temperatures are required, rather then open the hot water inlet valve further, the controller merely closes the cold water inlet valve further.

In a preferred embodiment, the controller is provided with a user interface allowing a user to indicate whether the water mixing valve is to be used in a system with an instantaneous water heater or not. If the user interface indicates that the water mixing valve is used in a system with an instantaneous water heater, then the controller can operate using minimum and/or maximum limits for the hot water inlet valve. For instance, it can run the learning process so as to establish these limits. On the other hand, if the user interface indicates that the system does not include an instantaneous water heater, then the controller can operate the water mixing valve using the full extent of the hot water inlet valve.

We claim:

1. A controller for a water mixing valve having a water outlet with an outlet water temperature sensor and having separately operable hot and cold water inlet valves, the controller including:
   an input for receiving a signal from the outlet water temperature sensor; and
   respective outputs for operating the hot and cold water inlet valves, the controller being arranged:
      to control the hot and cold water inlet valves to respective states which provide water in the water outlet having a temperature, as sensed by the outlet water outlet temperature sensor, selected by a user;
      upon detection by the outlet water temperature sensor of an outlet temperature less than that selected by the user to control the hot and cold water valve inlets to provide progressively a higher proportion of hot water in the water outlet;
      to judge whether or not the hot water inlet valve has been in a state to provide maximum flow of hot water in the water outlet for a predetermined period; and
      if the hot water inlet valve has been in the state to provide maximum flow of hot water inlet in the water outlet for the predetermined period whilst the outlet temperature remains less than that selected by the user, to move the hot and cold water inlet valves to states to provide a mixture of hot and cold water in the water outlet.

2. A method of controlling a water mixing valve having a water outlet with an outlet water temperature sensor and having separately operable hot and cold water inlet valves, the method including:
   controlling the hot and cold water inlet valves to respective states which provide water in the water outlet having a temperature, as sensed by the outlet water temperature sensor, selected by a user;
   upon detection by the outlet water temperature sensor of an outlet temperature less than that selected by the user, controlling the hot and cold water inlet valves to provide progressively a higher proportion of hot water in the water outlet;
   judging whether or not the hot water inlet valve has been in a state to provide maximum flow of hot water in the water outlet for a predetermined period; and
   if the hot water inlet valve has been in the state to provide maximum flow of hot water in the water outlet for the predetermined period whilst the outlet temperature remains less than that selected by the user, moving the hot and cold water inlet valves to states to provide a mixture of hot and cold water in the water outlet.

3. A water valve assembly in combination with the controller of claim 1, the water valve assembly including:
   a first housing;
   a first inlet chamber defining a first water inlet for receiving a flow of water into the first inlet chamber;
   a first valve for controlling flow of water through the first inlet into the first inlet chamber; and
   a mixing chamber connected to the first inlet chamber so as to receive water from the first inlet chamber, the mixing chamber defining a supplementary water inlet for receiving a supplementary flow of water and defining a mixed water outlet from which a mixture of water from the first inlet chamber and the supplementary water inlet may be provided;
   wherein the first inlet chamber and the mixing chamber are both provided within the first housing and are arranged one within the other.

* * * * *